US012289008B2

(12) United States Patent
Roberts et al.

(10) Patent No.: US 12,289,008 B2
(45) Date of Patent: Apr. 29, 2025

(54) TECHNOLOGIES FOR PROVIDING CONTINGENCY VEHICULAR CAUTION/EMERGENCY SIGNALING

(71) Applicant: DeadOn, LLC, McKinney, TX (US)

(72) Inventors: James Roberts, McKinney, TX (US); Allen Palmer, Celina, TX (US)

(73) Assignee: DeadOn, LLC, McKinney, TX (US)

( * ) Notice: Subject to any disclaimer, the term of this patent is extended or adjusted under 35 U.S.C. 154(b) by 164 days.

(21) Appl. No.: 18/117,827

(22) Filed: Mar. 6, 2023

(65) Prior Publication Data
US 2023/0283094 A1 Sep. 7, 2023

Related U.S. Application Data

(60) Provisional application No. 63/316,457, filed on Mar. 4, 2022.

(51) Int. Cl.
*H02J 7/00* (2006.01)
*B60Q 1/00* (2006.01)
*B60Q 1/50* (2006.01)
*B60R 16/033* (2006.01)

(52) U.S. Cl.
CPC .......... *H02J 7/0063* (2013.01); *B60Q 1/0076* (2013.01); *B60Q 1/543* (2022.05); *B60R 16/033* (2013.01); *H02J 7/0013* (2013.01); *H02J 7/00711* (2020.01)

(58) Field of Classification Search
CPC .... H02J 7/0063; H02J 7/0013; H02J 7/00711; B60Q 1/0076; B60Q 1/543; B60R 16/033
See application file for complete search history.

(56) References Cited

U.S. PATENT DOCUMENTS

| 3,185,961 | A | 5/1965 | Du Rocher |
| 5,736,793 | A | 4/1998 | Jahrsetz et al. |
| 5,775,712 | A | 7/1998 | Link et al. |
| 6,323,766 | B1 | 11/2001 | Bartlett et al. |
| 6,591,176 | B1 | 7/2003 | Perry et al. |

(Continued)

FOREIGN PATENT DOCUMENTS

| CN | 102745128 A | * 10/2012 |
| DE | 2836802 A1 | 3/1980 |

(Continued)

*Primary Examiner* — Curtis A Kuntz
*Assistant Examiner* — James E Munion
(74) *Attorney, Agent, or Firm* — The Belles Group, P.C.

(57) ABSTRACT

Technologies are disclosed for contingency vehicular signaling. A first DC power source may be connected with one or more indicators. The first DC power source may be connected with a second DC power source, and/or a third DC power source, via a semiconductor. The first DC power source may be configured to receive a second DC current flow from the second DC power source, and/or a third DC current flow from the third DC power source. The semiconductor may be configured to block a first DC current flow from the first DC power source to the second DC power source, and/or the third DC power source. The first DC power source may be configured to provide the one or more indicators with the first DC current flow via the at least one electrical switch regardless of a magnitude of the second DC current flow, and/or the third DC current flow.

25 Claims, 5 Drawing Sheets

(56) References Cited

U.S. PATENT DOCUMENTS

| | | | | |
|---|---|---|---|---|
| 6,879,251 | B2* | 4/2005 | Robbins | B60Q 1/52 |
| | | | | 340/471 |
| 7,956,490 | B2* | 6/2011 | Sotnikow | H02J 9/061 |
| | | | | 307/10.1 |
| 8,405,498 | B1 | 3/2013 | Smith et al. | |
| 2011/0210605 | A1* | 9/2011 | Duan | H02J 7/0031 |
| | | | | 307/9.1 |
| 2017/0331310 | A1* | 11/2017 | Schwartz | H02J 7/007182 |
| 2023/0307906 | A1* | 9/2023 | Hanaoka | H02J 7/0063 |

FOREIGN PATENT DOCUMENTS

| | | |
|---|---|---|
| DE | 202004004517 U1 | 8/2004 |
| DE | 102005054111 A1 | 5/2007 |
| JP | 2015020619 A * | 2/2015 |

\* cited by examiner

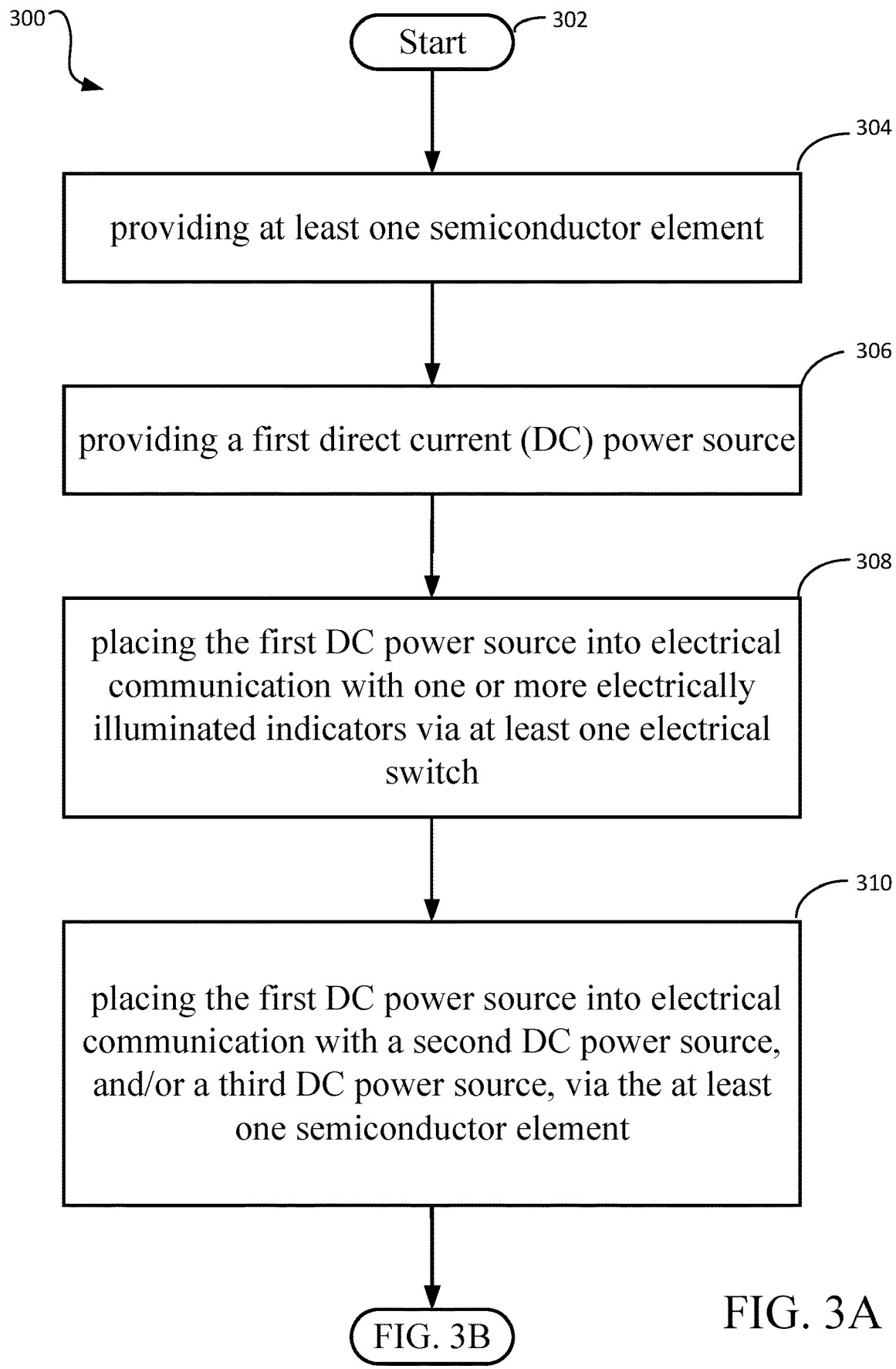

TECHNOLOGIES FOR PROVIDING CONTINGENCY VEHICULAR CAUTION/EMERGENCY SIGNALING

CROSS-REFERENCE TO RELATED APPLICATIONS

This application claims the benefit of U.S. Provisional Patent Application No. 63/316,457, filed on Mar. 4, 2022, the entirety of which is incorporated by reference herein, for all purposes.

BACKGROUND

Operators of vehicles, such as automotive vehicles, may encounter various situations while operating the vehicle that may result in the operator and/or the vehicle being/becoming disabled/inoperative. For example, the vehicle may run out of fuel, the vehicle's engine may fail, one or more vehicle tires may fail, the vehicle may be involved in a collision, among other disabling scenarios. And the vehicle's disablement might occur in, on, and/or near a location that experiences other vehicular traffic, such as a roadway, parking lot, driveways, or the like. In other words, the vehicle might become disabled in a relatively dangerous location and/or position. For example, another vehicle may collide with the disabled vehicle, among other undesirable scenarios.

And the vehicle could become disabled in such dangerous locations/positions in relatively low ambient light levels and/or during inclement weather conditions. Low ambient light levels and/or inclement weather conditions can likely add to the risk/danger of a disabled vehicle scenario. Due to the various vehicle-disabling scenarios, the operator of the vehicle (e.g., and any passengers) might not be able to leave the vehicle. Or the operator might not be able to move to a distance from the vehicle that might provide a material geographical spacing between the operator and the vehicle.

In such a disabled condition, the vehicle and/or the operator may remain in the dangerous location/position until the vehicle is returned to an operative condition and/or the vehicle is otherwise conveyed from the location/position (e.g., via a tow truck, or the like). The operator may choose to activate the vehicle's hazard indicating signaling in an attempt to mitigate the dangerous condition, at least to some degree, until the operator and/or the vehicle can be removed from the dangerous/risky location.

SUMMARY

Technologies are disclosed for devices and/or techniques for providing contingency vehicular signaling. At least at least one semiconductor element and a first direct current (DC) power source may be provided. The first DC power source may be placed into electrical communication with one or more electrically illuminated indicators via at least one electrical switch. The first DC power source may be placed into electrical communication with a second DC power source, and/or a third DC power source, via the at least one semiconductor element.

The first DC power source may be configured to receive a second DC current flow from the second DC power source, and/or a third DC current flow from the third DC power source. The at least one semiconductor element may be configured to block a first DC current flow from the first DC power source to the second DC power source, and/or the third DC power source. The first DC power source may be configured to provide the one or more electrically illuminated indicators with the first DC current flow via the at least one electrical switch regardless of a magnitude of the second DC current flow, and/or the third DC current flow.

Technologies are disclosed for devices and/or techniques for providing contingency vehicular signaling. At least one semiconductor element and a Lithium-Ion DC power source may be provided. The Lithium-Ion DC power source may be placed into electrical communication with one or more electrically illuminated indicators via at least one electrical switch. The Lithium-Ion DC power source may be placed into electrical communication with the first DC power source via the at least one semiconductor element.

The Lithium-Ion DC power source may be configured to receive a first DC current flow from the first DC power source. The at least one semiconductor element may be configured to block a second DC current flow from the Lithium-Ion DC power source to the first DC power source. The Lithium-Ion DC power source may be configured to provide the one or more electrically illuminated indicators with the second DC current flow via the at least one electrical switch regardless of a magnitude of the first DC current flow.

Technologies are disclosed for devices and/or techniques for providing contingency vehicular signaling. A device may configured to be placed into electrical communication with a first direct current (DC) power source, a second DC power source, at least one electrical switch, and/or one or more electrically illuminated indicators. The device may comprise a third DC power source and at least one semiconductor element.

The third DC power source may be configured to be in electrical communication with the one or more electrically illuminated indicators via the at least one electrical switch. The third DC power source may be configured to be in electrical communication with the first DC power source, and/or the second DC power source, via the at least one semiconductor element to receive a first DC current flow from the first DC power source, and/or a second DC current flow from the second DC power source.

The at least one semiconductor element may be configured to block a third DC current flow from the third DC power source to the first DC power source, and/or the second DC power source. The third DC power source may be configured to provide one or more electrically illuminated indicators with the third DC current flow via the at least one electrical switch regardless of a magnitude of the first DC current flow, and/or the second DC current flow.

Technologies are disclosed for devices and/or techniques for providing contingency vehicular signaling. A device may be configured to be placed into electrical communication with at least a first direct current (DC) power source, at least one electrical switch, and one or more electrically illuminated indicators. The device may comprise a Lithium-Ion DC power source; and at least one semiconductor element.

The Lithium-Ion DC power source may be configured to be in electrical communication with the one or more electrically illuminated indicators via the at least one electrical switch. The Lithium-Ion DC power source may be in electrical communication with the first DC power source via the at least one semiconductor element to receive a first DC current flow from the first DC power source.

The at least one semiconductor element may be configured to block a second DC current flow the Lithium-Ion DC power source to the first DC power source. The Lithium-Ion DC power source may be configured to provide the one or more electrically illuminated indicators with the second DC current flow via the at least one electrical switch regardless of a magnitude of the first DC current flow.

Technologies are disclosed for systems and/or techniques for providing contingency vehicular signaling. A system may comprise a first direct current (DC) power source, a second DC power source, a third DC power source, at least one electrical switch, one or more electrically illuminated indicators, and at least one semiconductor element.

The third DC power source may be configured to be in electrical communication with the one or more electrically illuminated indicators via the at least one electrical switch. The third DC power source may be configured to be in electrical communication with the first DC power source, and/or the second DC power source, via the at least one semiconductor element to receive a first DC current flow from the first DC power source, and/or a second DC current flow from the second DC power source.

The at least one semiconductor element may be configured to block a third DC current flow from the third DC power source to the first DC power source, and/or the second DC power source. The third DC power source may be configured to provide the one or more electrically illuminated indicators with the third DC current flow via the at least one electrical switch regardless of a magnitude of at the first DC current flow, and/or the second DC current flow.

Technologies are disclosed for systems and/or techniques for providing contingency vehicular signaling. One or more techniques may comprise providing a first direct current (DC) power source, a second DC power source, a third DC power source, at least one electrical switch, one or more electrically illuminated indicators, and/or at least one semiconductor element.

One or more techniques may comprise placing the third DC power source into electrical communication with the one or more electrically illuminated indicators via the at least one electrical switch. One or more techniques may comprise placing the third DC power source into electrical communication with the first DC power source, and/or the second DC power source, via the at least one semiconductor element.

One or more techniques may comprise configuring the third DC power source to receive a first DC current flow from the first DC power source, and/or a second DC current flow from the second DC power source. One or more techniques may comprise configuring the at least one semiconductor element to block a third DC current flow from the third DC power source to the first DC power source, and/or the second DC power source.

One or more techniques may comprise configuring the third DC power source to provide the one or more electrically illuminated indicators with the third DC current flow via the at least one electrical switch regardless of a magnitude of the first DC current flow, and/or the second DC current flow.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein:

FIG. 3A and FIG. 3B illustrates an example flow diagram of at least one technique for providing contingency vehicular signaling.

DETAILED DESCRIPTION

Figure 1:
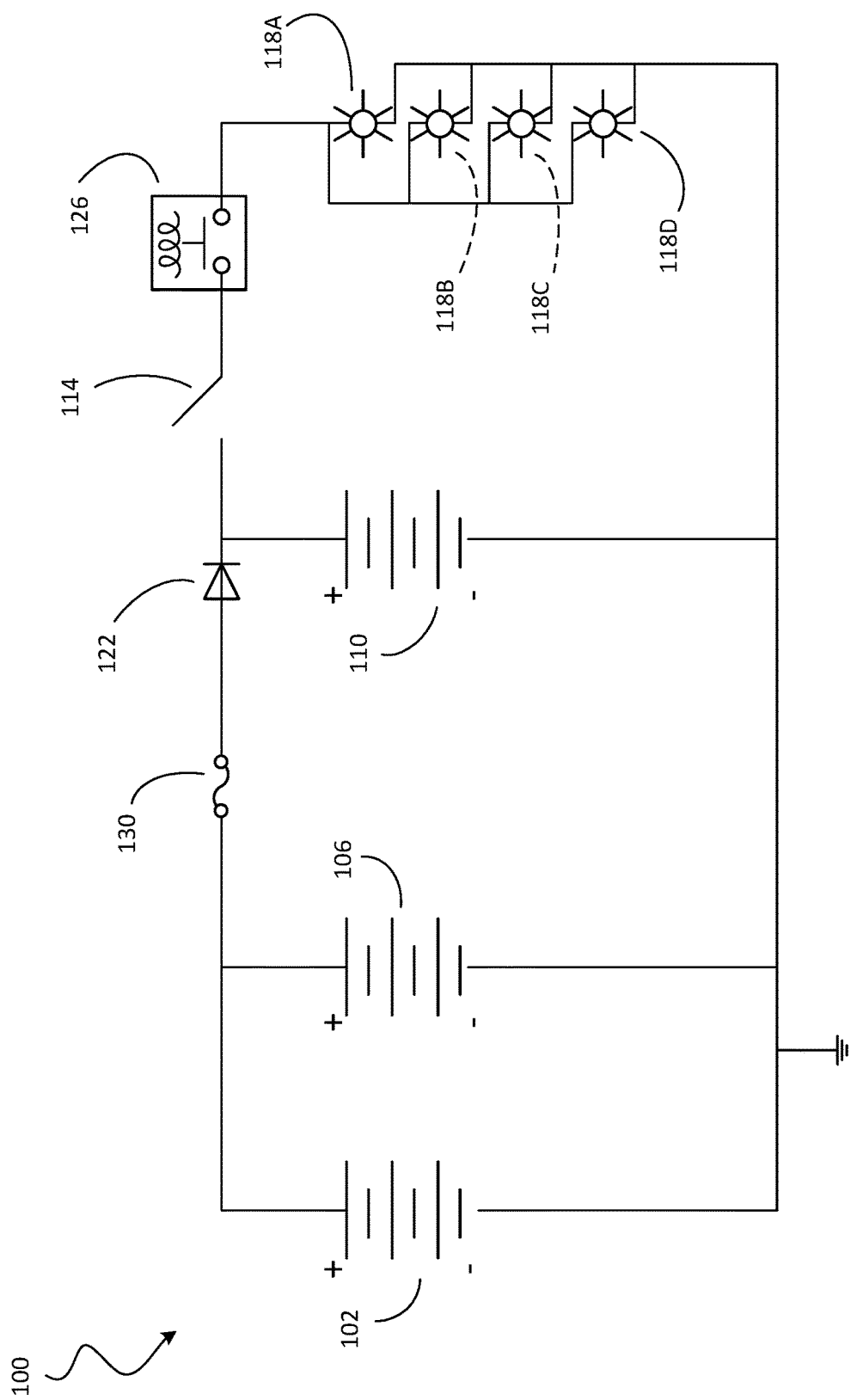
FIG. 1 is an example wiring/circuit diagram illustrating at least one perspective of a device/circuit/technique that may provide contingency vehicular signaling.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

Using current methods and/or devices, users/operators of vehicles and/or vehicle manufacturers, and/or vehicle aftermarket services providers do not have the techniques, functions, and/or capability to provide for contingency vehicular hazard/emergency signaling. With current methods and/or devices, if a disabled vehicle (and/or operators thereof, and any passengers therein) is in a dangerous location/position, the vehicle's hazard signaling will fail when/if the vehicle's alternator electrical output fails/drains and the vehicle's "starter" battery fails/drains.

Technologies that may provide users/operators of vehicles, and/or vehicle manufacturers, and/or vehicle aftermarket services providers with contingency vehicular caution/emergency signaling may be useful. Without the capabilities, techniques, methods, and/or devices described herein, the skilled artisan would not appreciate how to provide a vehicle with contingency caution/emergency signaling to sustain caution/emergency signaling after a vehicle's alternator and/or "starter batter" have failed/drained. One or more studies demonstrated over three hours of contingency signaling after the alternator and/or starter battery have failed/drained/become inoperative. Further, the skilled artisan would not appreciate how to provide such contingency caution/emergency signaling automatically—without a vehicle operator doing anything more than activating a vehicle's hazard signaling system/device.

FIG. 1 is an example wiring/circuit diagram illustrating at least one perspective of a device/system/circuit/technique 100 that may provide contingency vehicular signaling. As shown in FIG. 1, the device 100 may include a first direct current (DC) power source 102, a second DC power source 106, and/or a third DC power source 110. The device 100 may include at least one electrical switch 114 and/or one or more electrically illuminated indicators 118A, 118B, 118C, and/or 118D. The device 100 may include at least one semiconductor element 122, a flasher relay 126, and/or a fuse 130. The device 100 may include other electrical components, such as current protection and/or control components (e.g., fuses, relays, semiconductors, etc.), or the like, that are not shown.

In one or more scenarios, the third DC power source 110 may be configured to be in electrical communication with the one or more electrically illuminated indicators 118A-118D, perhaps for example via the at least one electrical switch 114. The third DC power source 110 may be configured to be in electrical communication with the first DC power source 102, and/or the second DC power source 106, perhaps for example via the at least one semiconductor element 122. As configured in this way, the third DC power source 110 may receive a first DC current flow (not shown) from the first DC power source 102, and/or a second DC current flow (not shown) from the second DC power source 106. Stated somewhat differently, the third DC power source 110 may receive a charging current (not shown) from the first DC power source 102 and/or the second DC power source 106. In one or more scenarios, the third DC power source 110 may draw from and/or "drain" the first DC power source 102 and/or the second DC power source 106, for example. Stated somewhat differently, the third DC power source 110 may be charged by the first DC power source 102 and/or the second DC power source 106 during the entire time that the first DC power source 102 and/or the second DC power source 106 may output charging current (not shown).

In one or more scenarios, the at least one semiconductor element 122 may be configured to block a third DC current flow (not shown) from the third DC power source 110 to the first DC power source 102, and/or the second DC power source 106. As configured in this way, the third DC power source 110 might not be drawn from and/or "drained" by the first DC power source 102 and/or the second DC power source 106, for example.

In one or more scenarios, the third DC power source 110 may provide the one or more electrically illuminated indicators 118A-118D with the third DC current flow (not shown), perhaps for example via the at least one electrical switch 114, regardless of a magnitude of the first DC current flow (not shown), and/or the second DC current flow (not shown). In other words, the third DC power source 110 may provide an energizing current flow (not shown) to the one or more electrically illuminated indicators 118A-118D, whether or not the first DC power source 102, and/or the second DC power source 106 are providing, or could provide, an energizing current flow (not shown) to the one or more electrically illuminated indicators 118A-118D.

In one or more scenarios, the at least one relay 126 may be configured to provide a time-pulsed DC output current flow (not shown) based on an input DC current flow (not shown). The third DC power source 110 may be configured to provide the one or more electrically illuminated indicators 118A-118D with the third DC current flow (not shown) via the at least one relay 126. This may provide a "flashing" effect for the energized one or more electrically illuminated indicators 118A-118D. In one or more scenarios, the one or more electrically illuminated indicators 118A-118D may be an automotive vehicle's hazard indicators, for example. In one or more scenarios, the at least one electrical switch 114 may be an automotive vehicle's operator-activated hazard light(s) activation switch.

In one or more scenarios, the first DC power source 102 may be electrochemical cell-based battery (e.g., an automotive vehicle "starter" battery), at least a one-cell lithium-ion battery, or a voltage regulated and rectified output of an electro-mechanical alternator (e.g., an automotive vehicle's alternator output). For example, the first DC power source 102 may output a nominal 12 Volt DC (VDC) bus voltage/potential difference/electromotive force, among other DC bus voltages. For example, the first DC power source 102 may have a 12.6 VDC input, perhaps with an output of 12.6-10.8 VDC.

In one or more scenarios, the second DC power source 106 may be an electrochemical cell-based battery (e.g., an automotive vehicle "starter" battery), at least a one-cell lithium-ion battery, or a voltage regulated and rectified output of an electro-mechanical alternator (e.g., an automotive vehicle's alternator output). For example, the second DC power source 106 may output a nominal 12 Volt DC (VDC) bus voltage/potential difference/electromotive force, among other DC bus voltages. For example, the second DC power source 106 may have a 12.6 VDC input, perhaps with an output of 12.6-10.8 VDC.

In one or more scenarios, the third DC power source 110 may be an electrochemical cell-based battery (e.g., an automotive vehicle "starter" battery), or at least a one-cell lithium-ion battery. For example, the third DC power source 110 may output a nominal 12 Volt DC (VDC) bus voltage/potential difference/electromotive force, among other DC bus voltages. For example, the third DC power source 110 may have a 12.6 VDC input, perhaps with an output of 12.6-10.8 VDC.

In one or more scenarios, the at least one semiconductor element 122 may be a diode, a rectifier diode, or a solid-state relay, for example. For example, the semiconductor element 122 may be a 20 amp, 50 volt, schottky diode, among other semiconductor devices.

In one or more scenarios, the device 100 may be constructed by modifying and/or augmenting a device/circuit/technique that may provide contingency vehicular signaling before the modification (not shown), thereby constructing the device 100 (e.g., an after-market vehicle modification). For example, the device, before the modification, may include the first direct current (DC) power source 102, the second DC power source 106, the at least one electrical switch 114, and/or the one or more electrically illuminated indicators 118A-118D. The device, before the modification, may include the flasher relay 126 and/or the fuse 130. The device, before the modification, may include other electrical components, such as current protection and/or control components (e.g., fuses, relays, semiconductors, etc.), or the like (not shown).

The device 100 may be configurable to be placed into electrical communication with at least the first direct current (DC) power source 102, the second DC power source 106, the at least one electrical switch 114, and the one or more electrically illuminated indicators 118A-118D. One or more techniques to construct the device 100 may comprise providing at least one semiconductor element 122 and/or providing the third direct current (DC) power source 110.

One or more techniques may comprise placing the third DC power source 110 into electrical communication with the one or more electrically illuminated indicators 118A-118D, perhaps for example via the at least one electrical switch 114. One or more techniques may comprise placing the third DC power source 110 into electrical communication with the first DC power source 102, and/or the second DC power source 106, perhaps for example via the at least one semiconductor element 122.

One or more techniques may comprise configuring the third DC power source 110 to receive the first DC current flow (not shown) from the first DC power source 102, and/or the second DC current flow (not shown) from the second DC power source 106. One or more techniques may comprise configuring the at least one semiconductor element 122 to block the third DC current flow (not shown) from the third DC power source 110 to the first DC power source 102 and/or the second DC power source 106.

One or more techniques may comprise configuring the third DC power source 110 to provide the one or more electrically illuminated indicators 118A-118D with the third DC current flow (not shown), perhaps for example via the at least one electrical switch 114 regardless of a magnitude of the first DC current flow (not shown), and/or the second DC current flow (not shown).

Figure 2:
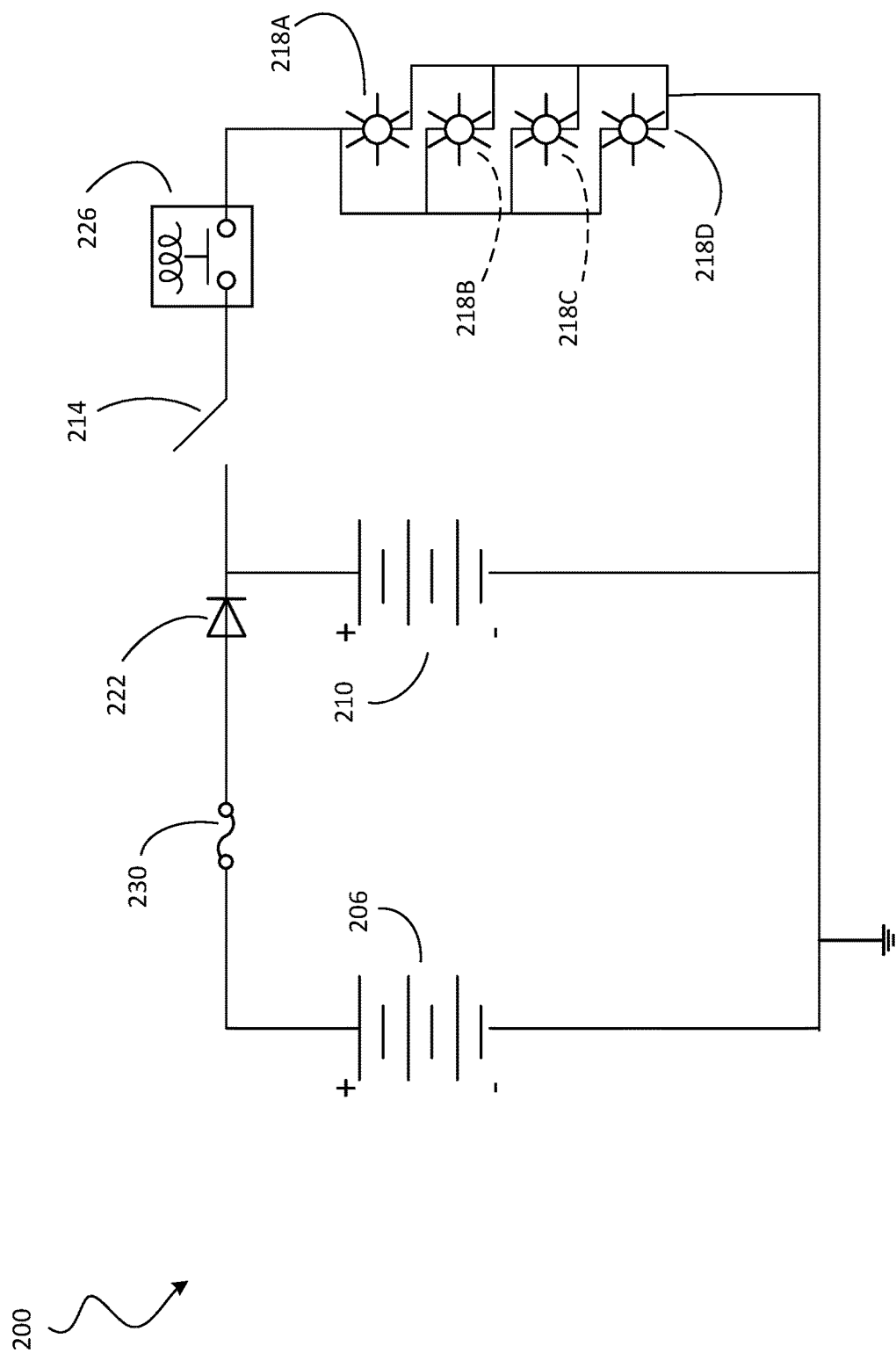
FIG. 2 is an example wiring/circuit diagram illustrating at least one perspective of a device/circuit/technique that may provide contingency vehicular signaling.

FIG. 2 is an example wiring/circuit diagram illustrating at least one perspective of a device/circuit/technique that may provide contingency vehicular signaling. As shown in FIG. 2, the device 200 may include a first direct current (DC) power source 206, and/or a second DC power source 210. The device 200 may include at least one electrical switch 214 and/or one or more electrically illuminated indicators 218A, 218B, 218C, and/or 218D. The device 200 may include at least one semiconductor element 222, a flasher relay 226, and/or a fuse 230. The device 200 may include other electrical components, such as current protection and/or control components (e.g., fuses, relays, semiconductors, etc.), or the like, that are not shown.

In one or more scenarios, the second DC power source 210 may be configured to be in electrical communication with the one or more electrically illuminated indicators 218A-218D, perhaps for example via the at least one electrical switch 214. The second DC power source 210 may be configured to be in electrical communication with the first DC power source 206, perhaps for example via the at least one semiconductor element 222. As configured in this way, the second DC power source 210 may receive a first DC current flow (not shown) from the first DC power source 206. Stated somewhat differently, the second DC power source 210 may receive a charging current (not shown) from the first DC power source 206. In one or more scenarios, the second DC power source 210 may draw from and/or "drain" the first DC power source 206, for example. Stated somewhat differently, the second DC power source 210 may be charged by the first DC power source 206 during the entire time that the first DC power source 206 may output charging current (not shown).

In one or more scenarios, the at least one semiconductor element 222 may be configured to block a second DC current flow (not shown) from the second DC power source 210 to the first DC power source 206. As configured in this way, the second DC power source 210 might not be drawn from and/or "drained" by the first DC power source 206, for example.

In one or more scenarios, the second DC power source 210 may provide the one or more electrically illuminated indicators 218A-218D with the second DC current flow (not shown), perhaps for example via the at least one electrical switch 214, regardless of a magnitude of the first DC current flow (not shown). In other words, the second DC power source 210 may provide an energizing current flow (not shown) to the one or more electrically illuminated indicators 218A-218D, whether or not the first DC power source 206, is providing, or could provide, an energizing current flow (not shown) to the one or more electrically illuminated indicators 218A-218D.

In one or more scenarios, the at least one relay 226 may be configured to provide a time-pulsed DC output current flow (not shown) based on an input DC current flow (not shown). The second DC power source 210 may be configured to provide the one or more electrically illuminated indicators 218A-218D with the second DC current flow (not shown) via the at least one relay 226. This may provide a "flashing" effect for the energized one or more electrically illuminated indicators 218A-218D. In one or more scenarios, the one or more electrically illuminated indicators 218A-218D may be an automotive vehicle's hazard indictors, for example. In one or more scenarios, the at least one electrical switch 214 may be an automotive vehicle's operator-activated hazard light(s) activation switch.

In one or more scenarios, the first DC power source 206 may be electrochemical cell-based battery (e.g., an automotive vehicle "starter" battery), at least a one-cell lithium-ion battery, or a voltage regulated and rectified output of an electro-mechanical alternator (e.g., an automotive vehicle's alternator output). For example, the first DC power source 206 may output a nominal 12 Volt DC (VDC) bus voltage/potential difference/electromotive force, among other DC bus voltages. For example, the first DC power source 206 may have a 12.6 VDC input, perhaps with an output of 12.6-10.8 VDC.

In one or more scenarios, the second DC power source 210 may be an electrochemical cell-based battery (e.g., an automotive vehicle "starter" battery), or at least a one-cell lithium-ion battery. For example, the second DC power source 210 may output a nominal 12 Volt DC (VDC) bus voltage/potential difference/electromotive force, among other DC bus voltages. For example, the second DC power source 210 may have a 12.6 VDC input, perhaps with an output of 12.6-10.8 VDC.

In one or more scenarios, the at least one semiconductor element 222 may be a diode, a rectifier diode, or a solid-state relay, for example. For example, the semiconductor element 222 may be a 20 amp, 50 volt, schottky diode, among other semiconductor devices.

In one or more scenarios, the device 200 may be constructed by modifying and/or augmenting a device/circuit/technique that may provide contingency vehicular signaling before the modification (not shown), thereby constructing the device 200 (e.g., an after-market vehicle modification). For example, the device, before the modification, may include the first direct current (DC) power source 206, the at least one electrical switch 214, and/or the one or more electrically illuminated indicators 218A-218D. The device, before the modification, may include the flasher relay 226 and/or the fuse 230. The device, before the modification, may include other electrical components, such as current protection and/or control components (e.g., fuses, relays, semiconductors, etc.), or the like (not shown).

The device 200 may be configurable to be placed into electrical communication with at least the first direct current (DC) power source 206, the at least one electrical switch 214, and the one or more electrically illuminated indicators 218A-218D. One or more techniques to construct the device 200 may comprise providing at least one semiconductor element 222 and/or providing the second direct current (DC) power source 210.

One or more techniques may comprise placing the second DC power source 210 into electrical communication with the one or more electrically illuminated indicators 218A-218D, perhaps for example via the at least one electrical switch 214. One or more techniques may comprise placing the second DC power source 210 into electrical communication with the first DC power source 206, perhaps for example via the at least one semiconductor element 222.

One or more techniques may comprise configuring the second DC power source 210 to receive the first DC current flow (not shown) from the first DC power source 206. One or more techniques may comprise configuring the at least one semiconductor element 222 to block the second DC current flow (not shown) from the second DC power source 210 to the first DC power source 206.

One or more techniques may comprise configuring the second DC power source 210 to provide the one or more electrically illuminated indicators 218A-218D with the second DC current flow (not shown), perhaps for example via the at least one electrical switch 214 regardless of a magnitude of the first DC current flow (not shown).

In one or more scenarios, one or more control/isolation relays, for example solid state or otherwise (not shown), may be used in device 100 and/or 200. For example, one or more control/isolation relays may be used to isolate the DC power source 110, 210 from the DC power sources 102, 106, 206. Such control/isolation relays may used in addition to, or in lieu of, a diode as the semiconductor element 122, 222. Such control/isolation replays may be controlled via local wiring, and/or via one or more control processors, such as those described with respect to FIG. 4.

In one or more scenarios, the DC power supply 110, 210 and/or the semiconductor element 122, 222, and/or at least some of the interconnecting wiring may be installed in most empty spaces on, near, and/or in an automotive engine/engine area, for example, in a 3.5×5.5 empty space (e.g., encased, and/or in an interior space of a vehicle). The DC power supply 110, 210 and/or the semiconductor element 122, 222 may be attached to many/most available braces or brackets.

In one or more scenarios, the DC power supply 110, 210 and/or the semiconductor element 122, 222 may be installed behind an instrument cluster of a vehicle. For example, after removing the instrument cluster, the DC power supply 110, 210 and/or the semiconductor element 122, 222 may be attached to a crash bar, dash pad brackets, and/or the HVAC box brackets, or the like.

In one or more scenarios, the DC power supply 110, 210 and/or the semiconductor element 122, 222 may be installed behind and/or around a vehicle glove box. For example, after removing the glove box, the DC power supply 110, 210 and/or the semiconductor element 122, 222 may be attached to a crash bar, dash pad brackets, and/or the HVAC box brackets, or the like.

In one or more scenarios, the DC power supply 110, 210 and/or the semiconductor element 122, 222 may be installed inside a vehicle console. For example, after removing the finish panels, the DC power supply 110, 210 and/or the semiconductor element 122, 222 may be attached to a number of different brackets, or the like.

In one or more scenarios, the DC power supply 110, 210 and/or the semiconductor element 122, 222 may be installed in a kick panel (e.g., either side). For example, after removing the kick panel, the DC power supply 110, 210 and/or the semiconductor element 122, 222 may be attached to one or more wiring harnesses, or the like.

In one or more scenarios, the DC power supply 110, 210 and/or the semiconductor element 122, 222 may be installed under the hood (e.g., in an engine compartment, etc.). There may be many brackets, braces, and/or large wire harnesses to choose from for mounting the DC power supply 110, 210 and/or the semiconductor element 122, 222. It may be useful to choose a mounting location as close to the firewall and/or as far from the engine as possible. For under the hood installations, wiring to the at least one electrical switch 114, 214 may be channeled through the firewall wire harness grommet and on to the at least one electrical switch 114, 214 (e.g., via a splice, etc.).

Figure 3B:
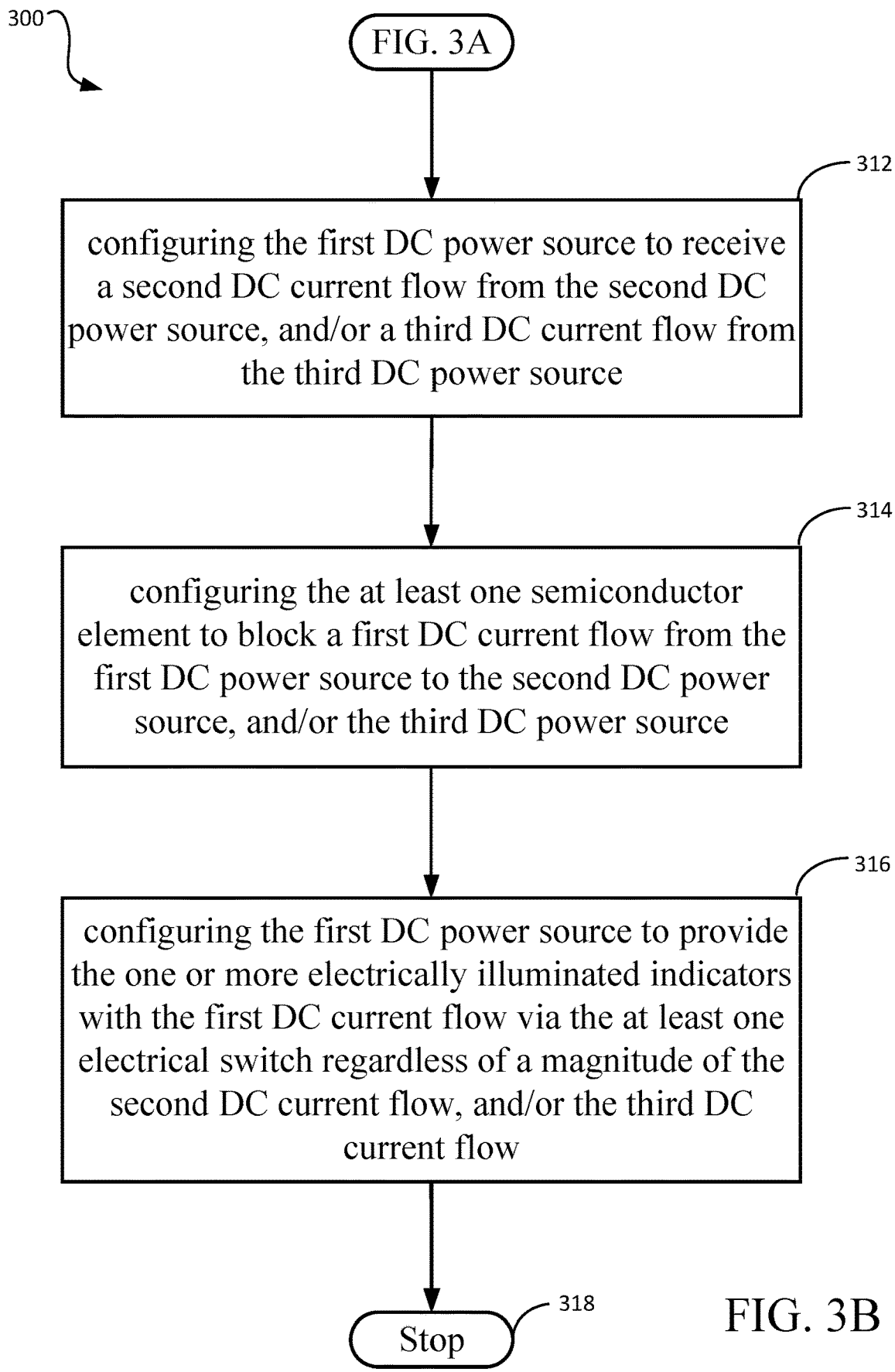

Referring now to FIG. 3A and FIG. 3B, a diagram 300 illustrates an example technique for providing contingency vehicular signaling. The methods/processes/techniques may be performed by one or more of the devices and/or circuits described herein, for example. At 302, the method may start or restart.

At 304, one or more methods may comprise providing at least one semiconductor element. At 306, one or more methods may comprise providing a first direct current (DC) power source. At 308, one or more methods may comprise placing the first DC power source into electrical communication with one or more electrically illuminated indicators via at least one electrical switch. At 310, one or more methods may comprise placing the first DC power source into electrical communication with a second DC power source, and/or a third DC power source, via the at least one semiconductor element.

At 312, one or more methods may comprise configuring the first DC power source to receive a second DC current flow from the second DC power source, and/or a third DC current flow from the third DC power source. At 314, one or more methods may comprise configuring the at least one semiconductor element to block a first DC current flow from the first DC power source to the second DC power source, and/or the third DC power source.

At 316, one or more methods may comprise configuring the first DC power source to provide the one or more electrically illuminated indicators with the first DC current flow via the at least one electrical switch regardless of a magnitude of the second DC current flow, and/or the third DC current flow. At 318 the method/process/technique may stop or restart.

Figure 4:
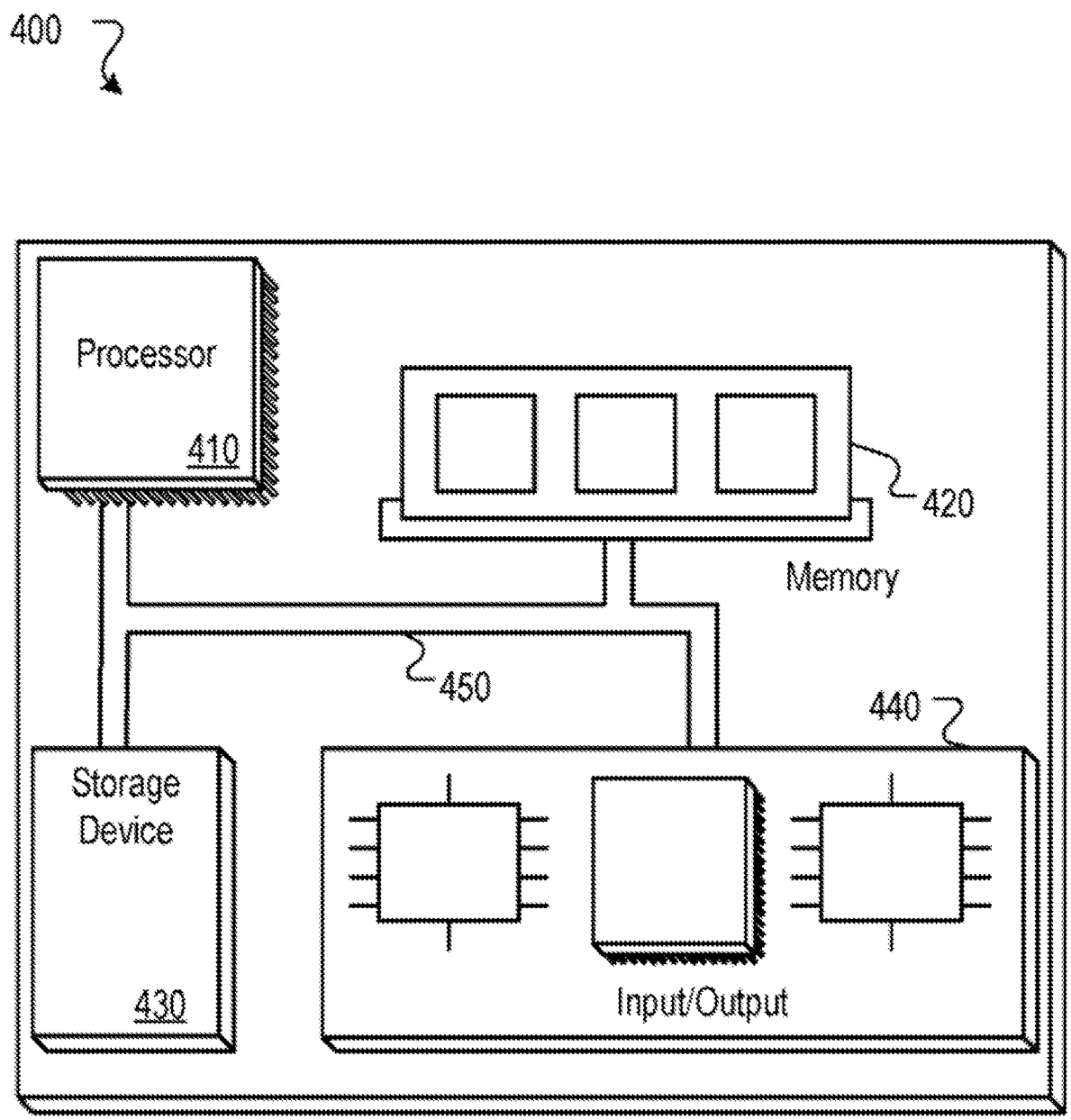
FIG. 4 is a block diagram of a hardware configuration of an example device that may control one or more aspects of one or more techniques for providing contingency vehicular signaling.

FIG. 4 is a block diagram of a hardware configuration of an example device that may function as a process control device/logic controller, such as an automotive vehicle's "black box" processing device, and/or a processing device associated with the one or more technologies/devices described herein, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400, such as for controlling the control/isolation relays (not shown) that may be part of devices 100 or 200, for example. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks.

The input/output device 400 may be in communication with one or more input/output modules (not shown) that may be proximate to the hardware configuration 400 and/or may be remote from the hardware configuration 400. The one or more output modules may provide input/output functionality in the digital signal form, discrete signal form, TTL form, analog signal form, serial communication protocol, fieldbus protocol communication and/or other open or proprietary communication protocol, and/or the like.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable subcombination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multitasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for providing contingency vehicular signaling, the method comprising:
    providing at least one semiconductor element;
    providing a first direct current (DC) power source;
    placing the first DC power source into electrical communication with one or more electrically illuminated indicators via at least one electrical switch, the at least one electrical switch having at least an open position and a closed position;
    placing the first DC power source into electrical communication with at least one of: a second DC power source, or a third DC power source, via the at least one semiconductor element;
    configuring the first DC power source to receive at least one of: a second DC current flow from the second DC power source, or a third DC current flow from the third DC power source;
    configuring the at least one semiconductor element to block a first DC current flow from the first DC power source to at least one of: the second DC power source, or the third DC power source; and configuring the first DC power source to provide the one or more electrically illuminated indicators with the first DC current flow via an operator-activated transition of the at least one electrical switch from the open position to the closed position, regardless of a magnitude of at least one of: the second DC current flow, or the third DC current flow, and the one or more electrically illuminated indicators remaining in electrical communication with at least one of: the second DC power source, or the third DC power source, with the at least one electrical switch transitioned to the closed position.

2. The method of claim 1, further comprising:
placing the first DC power source into electrical communication with at least one relay, the at least one relay configured to provide a time-pulsed DC output current flow based on an input DC current flow; and
configuring the first DC power source to provide the one or more electrically illuminated indicators with the first DC current flow via the at least one relay.

3. The method of claim 1, wherein at least one of: the second DC power source, or the third DC power source, is at least one of: an electrochemical cell-based battery, at least a one-cell lithium-ion battery, or a voltage regulated and rectified output of an electro-mechanical alternator.

4. The method of claim 1, wherein the first DC power source is at least one of: an electrochemical cell-based battery, or at least a one-cell lithium-ion battery.

5. The method of claim 1, wherein the at least one semiconductor element is at least one of: a diode, a rectifier diode, or a solid-state relay, and wherein the one or more electrically illuminated indicators are an automotive vehicle's hazard indictors.

6. A device configured for contingency vehicular signaling, the device being configurable to be placed into electrical communication with a first direct current (DC) power source, a second DC power source, at least one electrical switch having at least an open position and a closed position, and one or more electrically illuminated indicators, the device comprising:
a third DC power source; and
at least one semiconductor element, the third DC power source configured to:
be placed into electrical communication with the one or more electrically illuminated indicators via an operator-activated transition of the at least one electrical switch from the open position to the closed position;
be placed into electrical communication with at least one of: the first DC power source, or the second DC power source, via the at least one semiconductor element to receive at least one of: a first DC current flow from the first DC power source, or a second DC current flow from the second DC power source, the at least one semiconductor element configured to block a third DC current flow from the third DC power source to at least one of: the first DC power source, or the second DC power source; and
provide the one or more electrically illuminated indicators with the third DC current flow via an operator-activated transition of the at least one electrical switch from the open position to the closed position, regardless of a magnitude of at least one of: the first DC current flow, or the second DC current flow, and the one or more electrically illuminated indicators remaining in electrical communication with at least one of: the first DC power source, or the second DC power source, with the at least one electrical switch transitioned to the closed position.

7. The device of claim 6, wherein the device is further configurable to be placed into electrical communication with at least one relay, the at least one relay configured to provide a time-pulsed DC output current flow based on an input DC current flow, the third DC power source being further configured to provide the one or more electrically illuminated indicators with the third DC current flow via the at least one relay.

8. The device of claim 6, wherein the first DC power source is at least one of: an electrochemical cell-based battery, at least a one-cell lithium-ion battery, or a voltage regulated and rectified output of an electro-mechanical alternator.

9. The device of claim 6, wherein the second DC power source is at least one of: an electrochemical cell-based battery, at least a one-cell lithium-ion battery, or a voltage regulated and rectified output of an electro-mechanical alternator.

10. The device of claim 6, wherein the third DC power source is at least one of: an electrochemical cell-based battery, or at least a one-cell lithium-ion battery.

11. The device of claim 6, wherein the at least one semiconductor element is at least one of: a diode, a rectifier diode, or a solid-state relay.

12. The device of claim 6, wherein the one or more electrically illuminated indicators are an automotive vehicle's hazard indictors.

13. A system configured for contingency vehicular signaling, the system comprising:
a first direct current (DC) power source;
a second DC power source;
a third DC power source;
at least one electrical switch having at least an open position and a closed position;
one or more electrically illuminated indicators; and
at least one semiconductor element, the third DC power source configured to:
be in electrical communication with the one or more electrically illuminated indicators via an operator-activated transition of the at least one electrical switch from the open position to the closed position;
be in electrical communication with at least one of: the first DC power source, or the second DC power source, via the at least one semiconductor element to receive at least one of: a first DC current flow from the first DC power source, or a second DC current flow from the second DC power source, the at least one semiconductor element configured to block a third DC current flow from the third DC power source to at least one of: the first DC power source, or the second DC power source; and
provide the one or more electrically illuminated indicators with the third DC current flow via an operator-activated transition of the at least one electrical switch from the open position to the closed position, regardless of a magnitude of at least one of: the first DC current flow, or the second DC current flow, and the one or more electrically illuminated indicators remaining in electrical communication with at least one of: the first DC power source, or the second DC power source, with the at least one electrical switch transitioned to the closed position.

14. The system of claim 13, further comprising at least one relay, the at least one relay configured to provide a time-pulsed DC output current flow based on an input DC current flow, the third DC power source being further configured to provide the one or more electrically illuminated indicators with the third DC current flow via the at least one relay.

15. The system of claim 13, wherein the first DC power source is at least one of: an electrochemical cell-based battery, at least a one-cell lithium-ion battery, or a voltage regulated and rectified output of an electro-mechanical alternator.

16. The system of claim 13, wherein the second DC power source is at least one of: an electrochemical cell-based battery, at least a one-cell lithium-ion battery, or a voltage regulated and rectified output of an electro-mechanical alternator.

17. The system of claim 13, wherein the third DC power source is at least one of: an electrochemical cell-based battery, or at least a one-cell lithium-ion battery.

18. The system of claim 13, wherein the at least one semiconductor element is at least one of: a diode, a rectifier diode, or a solid-state relay.

19. The system of claim 13, wherein the one or more electrically illuminated indicators are an automotive vehicle's hazard indictors.

20. A method for providing contingency vehicular signaling, the method comprising:
   providing a first direct current (DC) power source;
   providing a second DC power source;
   providing a third DC power source;
   providing at least one electrical switch having at least an open position and a closed position;
   providing one or more electrically illuminated indicators;
   providing at least one semiconductor element;
   placing the third DC power source into electrical communication with the one or more electrically illuminated indicators via an operator-activated transition of the at least one electrical switch from the open position to the closed position;
   placing the third DC power source into electrical communication with at least one of: the first DC power source, or the second DC power source, via the at least one semiconductor element;
   configuring the third DC power source to receive at least one of: a first DC current flow from the first DC power source, or a second DC current flow from the second DC power source;
   configuring the at least one semiconductor element to block a third DC current flow from the third DC power source to at least one of: the first DC power source, or the second DC power source; and
   configuring the third DC power source to provide the one or more electrically illuminated indicators with the third DC current flow via an operator-activated transition of the at least one electrical switch from the open position to the closed position, regardless of a magnitude of at least one of: the first DC current flow, or the second DC current flow, and the one or more electrically illuminated indicators remaining in electrical communication with at least one of: the first DC power source, or the second DC power source, with the at least one electrical switch transitioned to the closed position.

21. The method of claim 20, further comprising:
   placing the third DC power source into electrical communication with at least one relay, the at least one relay configured to provide a time-pulsed DC output current flow based on an input DC current flow; and
   configuring the third DC power source to provide the one or more electrically illuminated indicators with the third DC current flow via the at least one relay.

22. The method of claim 20, wherein at least one of: the first DC power source, or the second DC power source, is at least one of: an electrochemical cell-based battery, at least a one-cell lithium-ion battery, or a voltage regulated and rectified output of an electro-mechanical alternator.

23. The method of claim 20, wherein the third DC power source is at least one of: an electrochemical cell-based battery, or at least a one-cell lithium-ion battery.

24. The method of claim 20, wherein the at least one semiconductor element is at least one of: a diode, a rectifier diode, or a solid-state relay.

25. The method of claim 20, wherein the one or more electrically illuminated indicators are an automotive vehicle's hazard indictors.

* * * * *